United States Patent [19]

Ahlen

[11] 4,178,814

[45] Dec. 18, 1979

[54] TWO-SPEED GEAR TRANSMISSION

[75] Inventor: Karl G. Ahlen, Stockholm, Sweden

[73] Assignee: S.R.M. Hydromekanik Aktiebolag, Stockholm,, Sweden

[21] Appl. No.: 729,261

[22] Filed: Oct. 4, 1976

Related U.S. Application Data

[63] Continuation-in-part of Ser. No. 450,781, Mar. 13, 1974, abandoned.

[51] Int. Cl.² ............................................. F16H 57/10
[52] U.S. Cl. .................................................. 74/781 R
[58] Field of Search ...................... 74/781 R; 192/3.29

[56] References Cited

U.S. PATENT DOCUMENTS

| | | | |
|---|---|---|---|
| 2,136,971 | 11/1938 | Fleischel | 74/782 R X |
| 2,578,308 | 12/1951 | Iavelli | 74/781 R |
| 2,939,558 | 6/1960 | Schjolin | 74/781 R X |
| 3,090,257 | 5/1963 | Schjolin | 74/781 R |
| 3,295,394 | 1/1967 | Whateley | 74/781 R |
| 3,382,736 | 5/1968 | Abbott | 74/781 R X |
| 3,893,551 | 7/1975 | Ahlen | 192/3.29 X |

*Primary Examiner*—Lance Chandler
*Attorney, Agent, or Firm*—Larson, Taylor and Hinds

[57] ABSTRACT

A two-speed planetary gear transmission including direct drive connectable by a clutch wherein the input and output shafts rotate together and a second gear drive namely overdrive or underdrive wherein one of the sun or ring gears are held stationary by a brake relative to the casing. A spring which causes engagement of the direct drive clutch exerts its greatest force when the clutch is engaged, it exerts a relatively high biasing force upon initial disengagement of the clutch under the action of an actuating device such as a servomotor, to thereby assure initially a significantly reduced level of torque transfer at the brake, to thereby provide a smooth gear transition. The spring force then becomes significantly less when the brake is engaged. The forces exerted by the spring in direct drive and by the actuating device in second gear drive bypass rotary bearings which are in motion at such times.

35 Claims, 7 Drawing Figures

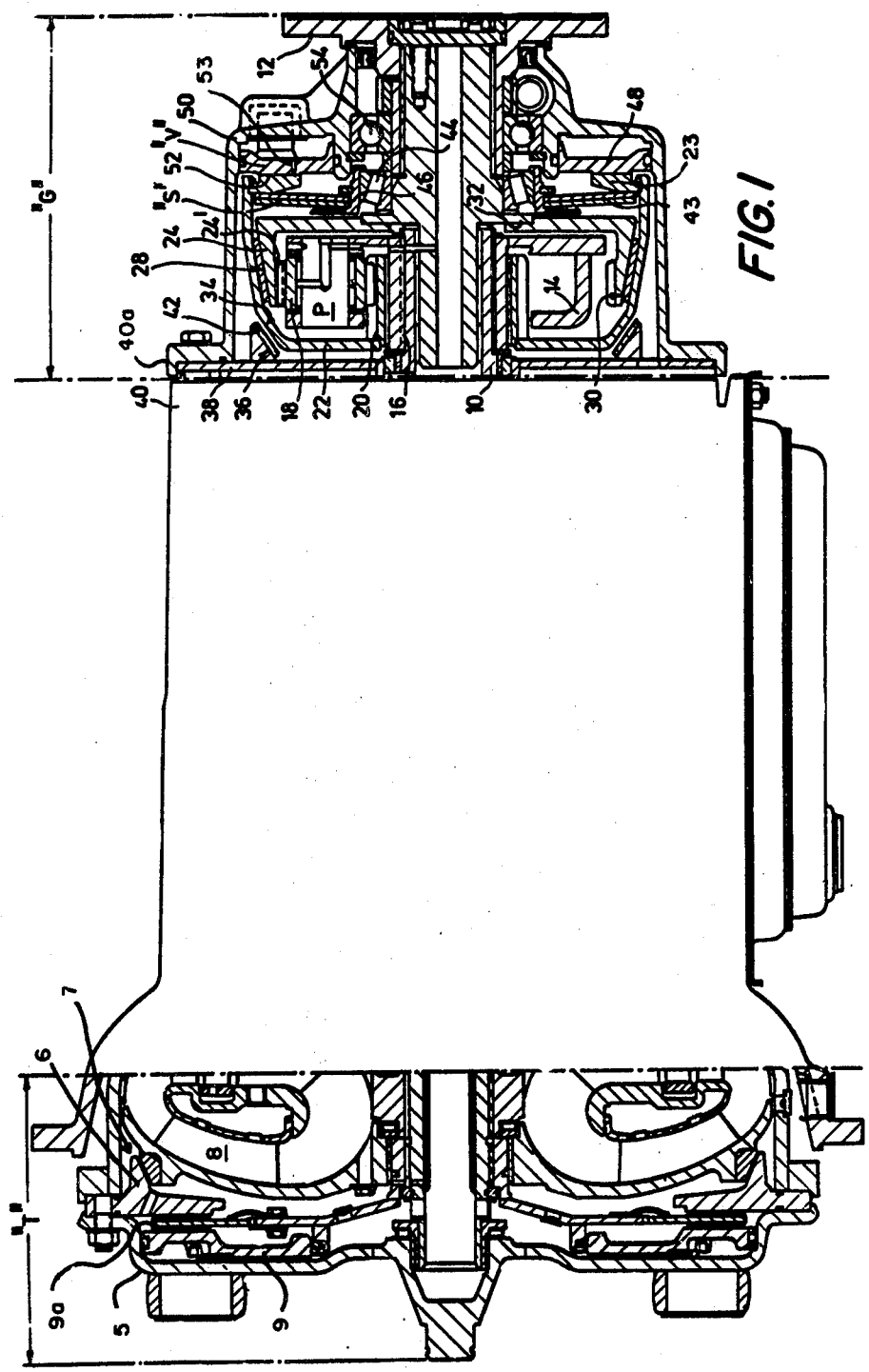

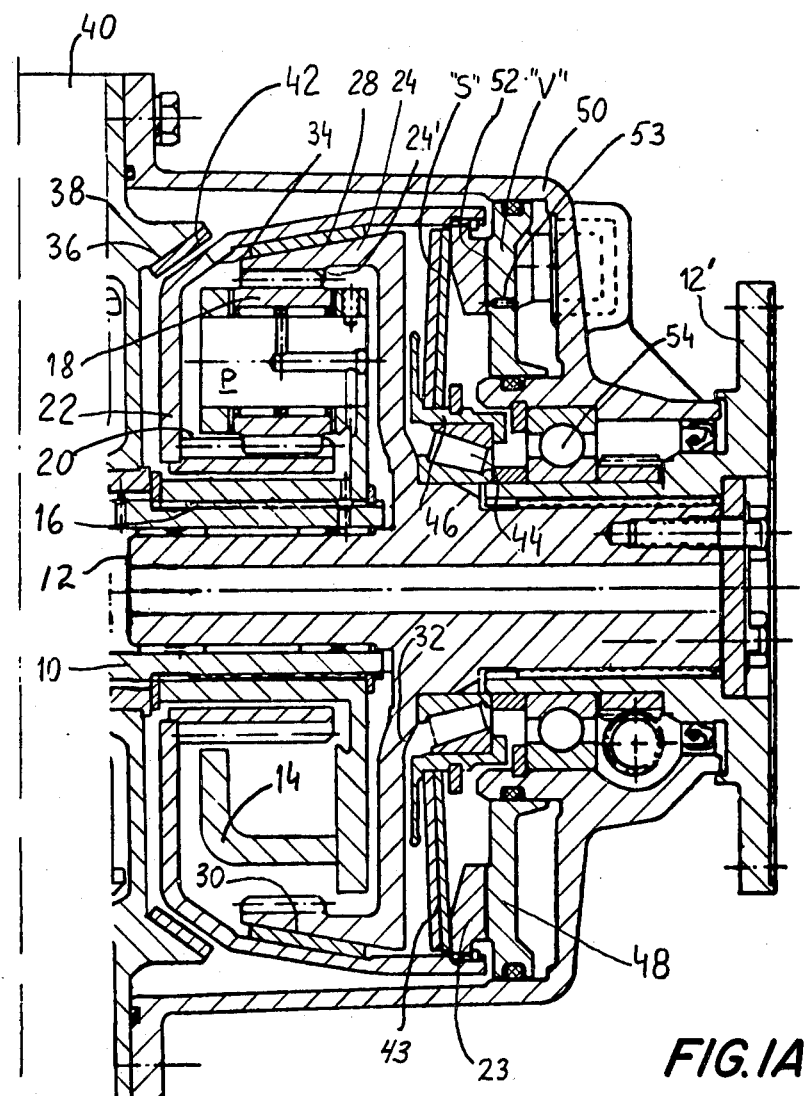
FIG.IA
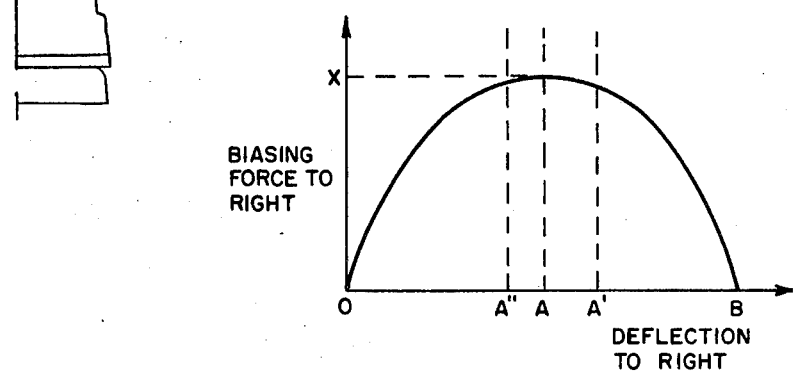
FIG.3

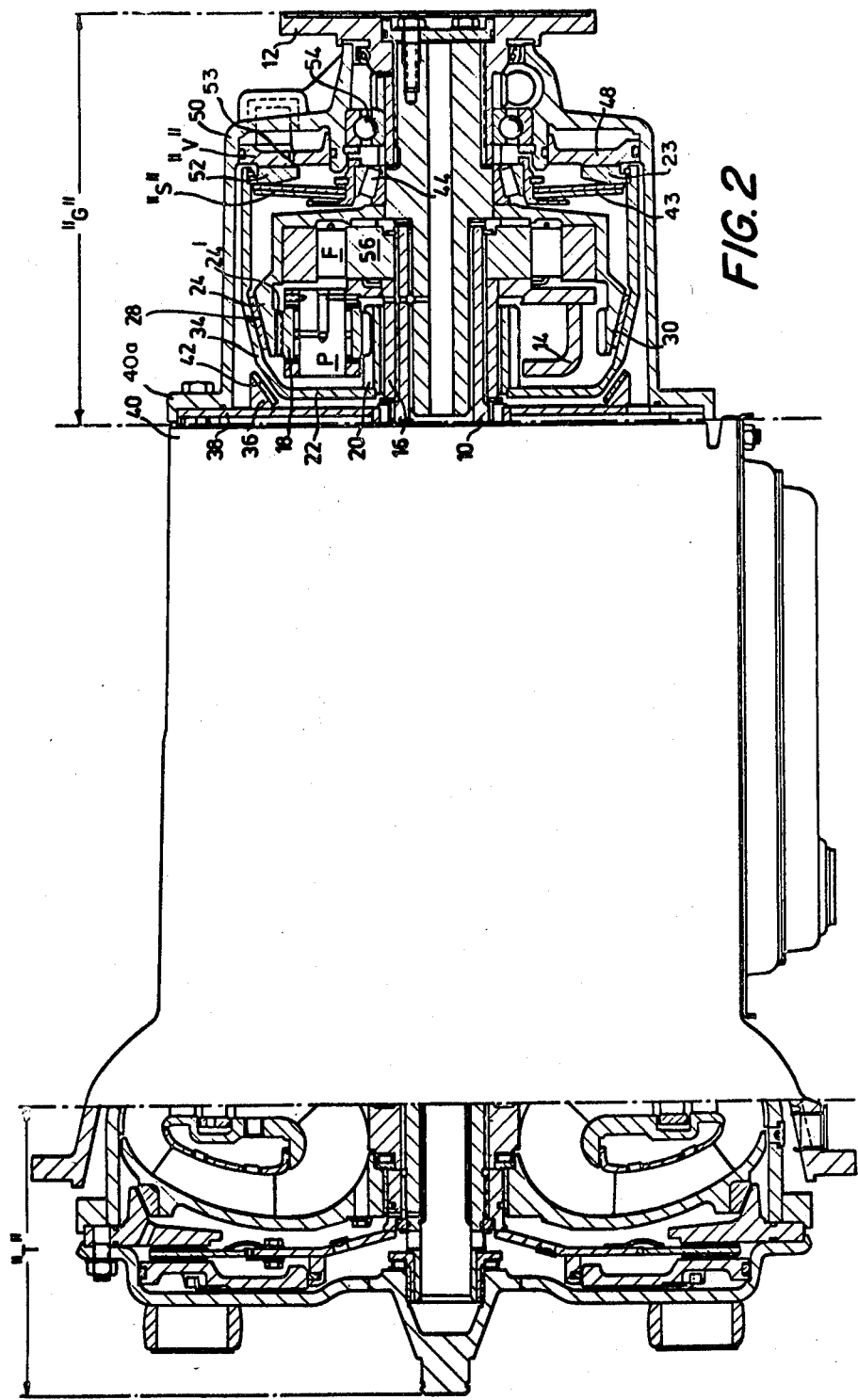

TWO-SPEED GEAR TRANSMISSION

RELATED APPLICATION

This application is a continuation-in-part of my earlier application Ser. No. 450,781, filed Mar. 13, 1974, now abandoned.

BACKGROUND OF THE INVENTION

This invention relates to gear transmissions, and in particular it relates to an improved two-speed planetary gear transmission.

Many types of two-speed gear transmissions are known, such as for use with a hydrodynamic transmission, i.e. a torque converter, and these include planetary gear transmissions providing direct drive by using a clutch to operatively connect the input and output shafts for rotation together, and providing overdrive or underdrive by using a brake to hold one of the sun or ring gears stationary relative to a casing. However, such known two-speed gear transmissions include power shift friction couplings and are normally very heavy due to the high capacity of the clutch and the brake. If the transmission is simplified by the use of a free wheel instead of a power shift coupling, then of course the gear transmission cannot transmit torque in both directions, i.e. driving torque and braking torque. Moreover, the forces of the clutch or brake which are exerted upon rotary bearings of the two-speed gear transmission which are in motion have either resulted in short bearing life and/or have resulted in requiring a rather large design of the transmission so as to provide an overall structure and bearings which can withstand such clutch and brake forces.

Hence, there exists a need for providing a two-speed planetary gear transmission having improved clutch and brake force characteristics which will permit the design of a two-speed planetary gear transmission of the type described which is more compact and/or wherein the wear upon the bearings is reduced, and which can transmit torque in both directions, i.e. drive torque and braking torque, in both direct drive and overdrive or underdrive.

SUMMARY OF THE INVENTION

Hence, it is a purpose of the present invention to provide a new and improved two-speed planetary gear transmission which will overcome the disadvantages of the prior art. The present invention includes a number of features which achieve this purpose.

In accordance with a first feature of the present invention, there is provided a two-speed planetary gear mounted in a stationary casing wherein direct drive between the gears is brought about by engagement of a first friction coupling, referred to hereinafter as a clutch, under the action of a spring arrangement, and the other drive such as overdrive or underdrive is brought about by engagement of a second friction coupling, referred to hereinafter as the brake, under the action of a further actuating means such as a servo-motor which overcomes the spring force to disconnect the clutch and to thereafter connect the brake. The spring arrangement has the characteristic of exerting its greatest force at its position corresponding to clutch engagement or close thereto, and a significantly lower spring force at its position corresponding to brake engagement. With such characteristics, it is possible to use the strong spring force both for strong clutch engagement and also for retarding the action of the servo-motor to significantly reduce the level of torque transfer in the interval between clutch disengagement and brake engagement, thus providing a soft transition from clutch to brake, and yet essentially eliminating the spring resistance to the servo-motor since, as the servo-motor approaches and reaches its brake engaging position, because of the weaker spring force existing at that time, the servo-motor can be of a relatively smaller construction since it does not have to overcome a strong spring force near and at brake engagement.

In accordance with a second feature of the present invention, there is provided a two-speed planetary gear transmission mounted in a stationary casing wherein direct drive between the input and output shafts is brought about by a clutch engaged under the action of a spring arrangement and the other drive such as overdrive or underdrive is brought about by a brake engaged under the action of a further actuating device which first overcomes the spring force and then causes engagement of the brake, and wherein the usual rotary bearings are provided for relative rotation as required between the respective parts of the planetary gear, the input and output shafts and the stationary casing, and wherein the spring arrangement and further actuating device are arranged such that when each exerts its maximum force to cause engagement of the clutch or brake, respectively, the closed path of the forceloop created by each bypasses any rotary bearings across which there is relative rotary motion of that time. Accordingly, significant bearing wear usually resulting from strong axial forces thereon while in motion is eliminated in the arrangement of the present invention, thereby significantly extending bearing life and/or permitting a smaller overall construction.

A planetary gear transmission including both of the first and second above described features has the significant advantage of providing an arrangement in which the spring and other actuating device such as a servo-motor can both be quite strong since they cooperate with each other rather than fight each other, and since such strong forces are not transmitted through the moving rotary bearings, such rotary bearings have less wear and a longer life and as a result thereof the overall design of the bearings and the transmission can be more compact.

The above described feature concerning bypassing of the moving rotary bearings by the spring and servo-motor forces can be stated a different way, namely all of the elements in the force loop associated with the spring during clutch engagement or associated with the servo-motor during brake engagement do not rotate relative to each other, i.e. they all rotate together or they all remain stationary. Viewed in this manner it of course necessarily follows that the path of the force loop in each case does not cross over any moving rotary bearings.

Another feature of the present invention is that with the construction provided therein, it is possible to provide torque transfer in both directions, i.e. driving torque and braking torque, for both speeds of the gear transmission. However, if desired it is also possible to use a free wheel connection between the input shaft and the output shaft in parallel with the clutch in the event that it is necessary to hold the clutch engaged only for lower torque at coasting.

The two-speed planetary gear transmission according to the present invention is particularly suitable for use with a hydrodynamic torque converter having one of the torque transmitting bladed components, i.e. the pump blades or the turbine blades released from the input driving source or the output shaft, respectively, since the reduction in torque provided by such a releasable torque converter component is so significant that it will permit a reduction in the friction surfaces of the clutch and brake of the planetary gear transmission to a minimum size allowing synchronization when no torque is being transmitted therethrough, after which the forces causing engagement of the clutch can be raised to enable transmission of high torque. Moreover, this arrangement provides a soft transition from one gear to the other. Torque converters of the type having a releasable bladed component are shown and described in my U.S. Pat. No. 3,893,551 which relates to a torque converter having a releasable pump component and my U.S. Pat. No. 3,893,864, which relates to a torque converter having a releasable turbine component.

The above described spring arrangement characteristics may conveniently be provided by using a Belleville spring. If such a spring is dished for example to the right, then the forces exerted by that spring to the right are essentially nil when the spring lies in a plane and essentially nil when the spring is in its fully dished position. Midway between those two positions, however, it is at a maximum. Stated differently, the force characteristics of the Belleville spring are similar to a sine curve. Hence, when using such a spring in the present invention the spring would be arranged such that in the clutch engaged position the Belleville spring would be half-way between its plane condition and its fully dished condition, and upon brake engagement the spring would reach substantially its plane low force condition. The spring arrangement may include a plurality of Belleville springs or even a combination of different types of springs, the characteristics of which are as described above.

Braking is preferably achieved by a servo-motor stationarily mounted in the casing. As the servo-motor is initially actuated, it meets the resistance of the high spring force, thus retarding the servo-motor, thereby assuring a momentary significant drop in torque transfer through the planetary gear transmission, further assuring a soft transition between gear speeds. Then, as the servo-motor continues, it eventually moves the spring to the position whereat its force opposing the servo-motor is minimal, whereby the servo-motor forces can be concentrated on engaging the brake.

Several embodiments are provided, in each of which the above described features of the present invention are achieved.

In accordance with a first embodiment, either the input shaft is operatively engaged with the planetary gear carrier, the sun gear is adapted to be braked and the ring gear connected to the output shaft for overdrive or the input shaft is operatively engaged with the ring gear, the sun gear is adapted to be braked, and the planetary gear carrier is connected to the output shaft for underdrive. In accordance with this first embodiment, an element extending from the sun gear is slidable between a first position at which the sun and ring gears are engaged for rotation together and a second position wherein the sun gear is connected to the stationary casing. In accordance with this first embodiment, said slidable part includes conical frictional surfaces for engagement at each of the two positions. In the specific arrangement of overdrive, a first embodiment may include springs acting between a first part movable with the sun gear and a second part which via a rotary bearing acts against the ring gear. In direct drive, the sun and ring gears move together so that said rotary bearing is not in motion.

In accordance with another embodiment of the invention, the sun gear which is adapted for engagement with the casing during overdrive and underdrive may include means for connection to the casing or for connection of the sun and ring gear together, by means of friction engaging discs rather than conical frictional surfaces. In accordance with one specific embodiment, the sun gear may include a slidable part slidable in one direction under the influence of the spring arrangement to cause engagement of disc frictional surfaces for connection of the sun and ring gears together for rotation as a unit and for movement in the opposite direction under the influence of the servo-motor for a disc type frictional engagement between said slidable part and the stationary casing. In this embodiment the spring means may act between two parts associated with the sun gear.

In accordance with still another embodiment of the present invention, the sun gear may include, in addition to frictional clutch and brake surfaces, a spring arrangement including a combination of springs, namely a coil spring for continuously urging the clutch into engagement coupled with a Belleville spring, wherein the parts are so arranged that during the very initial portion of the servo-motor actuation, it moves quite easily, opposing only the coil spring, thereby relatively easily disengaging the clutch, after which initial moment it opposes the full force of a Belleville spring, whereupon it is significantly retarded, thereby assuring the interval of minimal torque transfer through the planetary gear transmission, after which the servo-motor overcomes the spring force as said spring force is significantly reduced in accordance with the above described spring characteristics.

The objects and advantages of the present invention will become apparent from the detailed description to follow, together with the accompanying drawings.

BRIEF DESCRIPTION OF THE DRAWINGS

There follows a detailed description of preferred embodiments of the present invention to be read together with the accompanying drawings in which:

FIG. 1 is a partial side elevational and partial cross-sectional view of a transmission including a torque converter in combination with a two-speed planetary gear transmission of the present type.

FIG. 1A is an enlarged view of that portion of FIG. 1 showing the two-speed planetary gear transmission.

FIG. 2 is a side elevational and cross-sectional view similar to FIG. 1 but showing a modified version of the present invention.

FIG. 3 is a graph illustrating the general characteristics of a Belleville type spring.

DETAILED DESCRIPTION OF THE PREFERRED EMBODIMENTS

Figure 4:
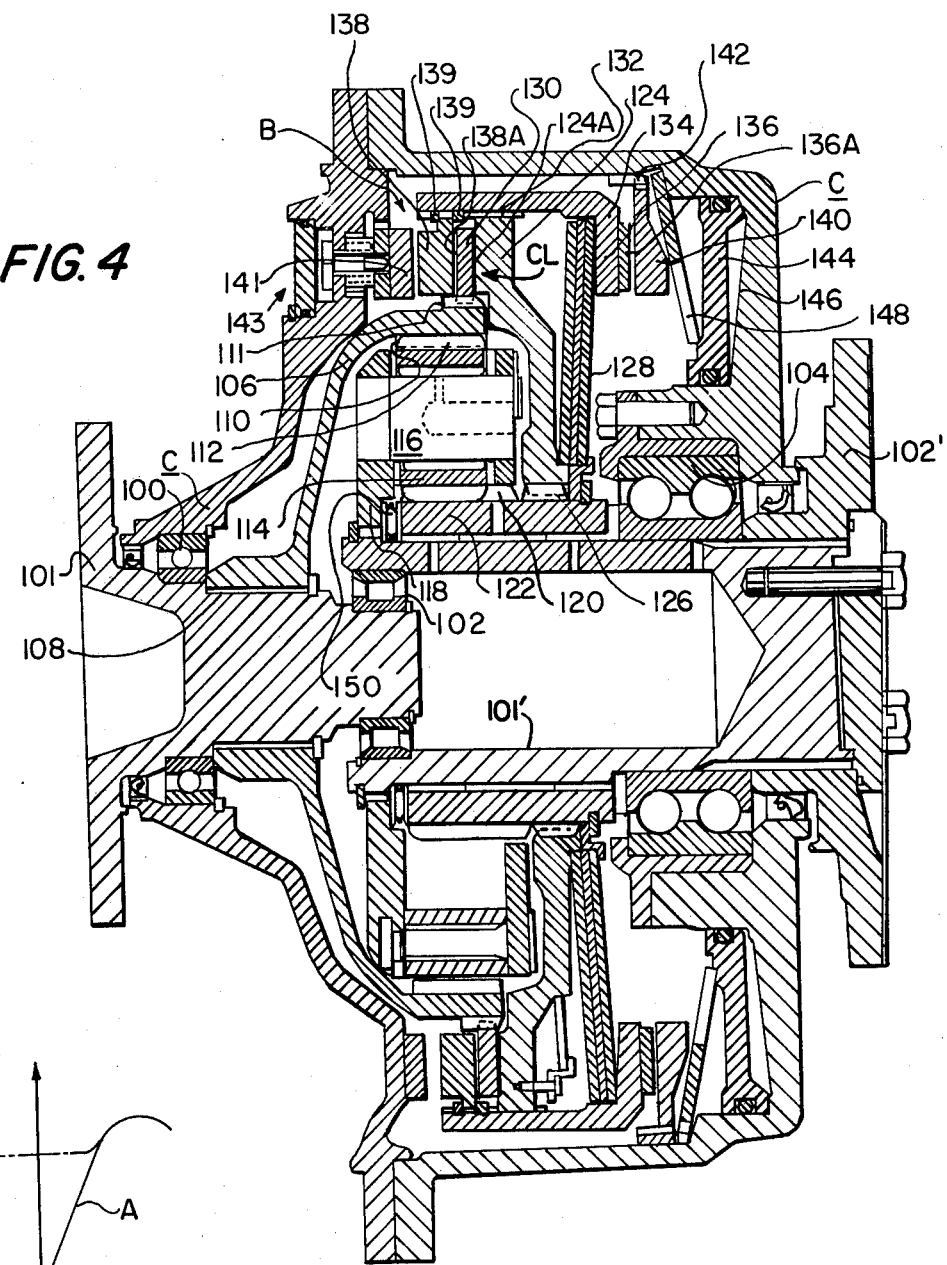
FIG. 4 is a longitudinal cross-sectional view through a two-speed planetary gear transmission showing another embodiment of the present invention.

Referring now to the drawings, like elements are represented by like numerals throughout the several views.

Referring to FIG. 1, there is shown at the left hand side thereof a torque converter T, of a type which is similar to that shown in my U.S. Pat. No. 3,893,551 in that it includes a releasable pump member. One could also use a releasable turbine member torque converter of the type shown in my U.S. Pat. No. 3,839,864. Referring to FIG. 1, there is shown a rotary casing 5 which is the main drive input to the transmission. For hydraulic drive the pump member 8 including a ring of pump blades is moved to the left whereby via coupling 7 it engages intermediate member 6 which is fixed to the casing 5. For direct drive between the rotary casing 5 and the output shaft of the torque converter, a servo-piston 9 within rotary casing 5 is moved to the right, frictionally engaging friction surfaces of a flange member 9a between element 9 and element 6, whereby torque is transferred from rotary casing 5 to the flange 9a which is in turn connected to the turbine output shaft, thereby providing direct drive.

Referring now to the right hand side of FIG. 1 and also FIG. 1A, the gear transmission G includes a planetary gear system P concentrically mounted relative to an input shaft 10 and an output shaft 12, the latter being connected to an output flange 12'. The planetary gear P includes a planetary gear carrier 14 drivingly connected to the input shaft 10 by means of spline connection 16. One or more planet gears 18 is supported by the carrier 14. Sun gear 20 of the planetary gear is carried on a member 22, which will be described in greater detail below, and which forms a common part with the first coupling which is a clutch and the second coupling which is a brake.

An outer ring gear 24 of the planetary gear has a conical outer surface 28, which together with a correspondingly shaped conical surface 30 on the member 22 constitutes the first coupling which is a clutch. As is evident from FIG. 1, the member 24 is rigidly connected to the output shaft 12 at 32 for rotation therewith. The second coupling or brake comprises a conical surface 34, also formed on the member 22, and a correspondingly shaped conical surface 36 formed on a stationary abutment 38 rigid with the stationary casing 40 of the transmission, said surface 36 including a band of friction material 42 thereon.

Connection of the clutch 28, 30 and disconnection of the brake 34, 36 is accomplished by a spring arrangement S which in this embodiment comprises one or more overcentered springs 43. In a preferred arrangement, these springs are of the Belleville type. On their radial inner surfaces, the springs are supported on an intermediate flanged sleeve 46 which is in turn mounted on shaft 12 by means of conical roller bearing 44. On the other side the springs 43 are urged against an intermediate member 23 which is fixed to member 22 for rotation therewith.

Also illustrated in FIGS. 1 and 1A is a servo-motor V including an annular non-rotating piston 48 movable axially within cylinder 50 which is rigid with the stationary casing 40. The interface between elements 23 and 48 is a plane bearing surface 52 and is lubricated by oil delivered through channels 53 formed in the piston 48.

The output shaft elements 12 and 12' are supported in the casing 40 in the area of cylinder 50 by means of roller bearing 54.

In the position as shown in FIGS. 1 and 1A, the first coupling or clutch 28, 30 is shown in the engaged position under the action of springs 43 and in the absence of sufficient pressure within cylinder 50 to overcome such spring force. In the position as shown, the springs 43 exert their maximum force to the right, and their minimum force is exerted when the springs 43 have been moved to the left to a plane position. To further understand these spring characteristics, references made to FIG. 3 which shows the general characteristics of a Belleville spring arranged in a vertical plane and naturally dished to the right. When the spring lies in a vertical plane, i.e. at point 0 along the horizontal axial of FIG. 3, it exerts no biasing force to the right. As the spring deflects to the right the force which it exerts in that direction increases to a peak and then falls off, obviously becoming zero when the spring has reached its natural relaxed dished position. Thus, in the present invention a spring is selected and arranged such that in the position as shown in FIGS. 1 and 1A the spring is dished to the right only a portion of its total deflection. If one desires that the absolute maximum force of the spring be felt in the clutch engaged position, one would select deflection to point A at the clutch engaged position. Alternatively, it may be desirable to select a point other than A, for example A' which is past the peak so that the maximum spring resistance to travel of the servo-motor 48 is not at the instant it initiates travel, but rather slightly beyond that point. Alternatively, if one wishes to have a spring characteristic which is less than its maximum in the position illustrated in FIGS. 1 and 1A, and decreases thereafter, then one would select a point such as A".

Whichever specific spring characteristics are selected, it is a feature of the invention that when the clutch is disconnected by movement of piston 48 to the left, such movement is initially retarded by the then existing strong biasing force of spring 43. This will assure momentary disengagement, concurrently, of both the clutch and the brake, thereby providing an interval of significantly reduced torque through the planetary gear system G. As a result thereof, there will a smooth transition from clutch engagement to clutch disengagement and to brake engagement. It is another feature of the invention that after this momentary interval, as the piston 48 continues its movement to the left, the resistance offered by springs 43 greatly diminishes, whereby the piston 48 is capable of effecting a firm engagement of brake 34, 36.

The embodiment of FIGS. 1 and 1A operates as an overdrive since upon engagement of the brake 34, 36, the output shaft rotates faster than the input shaft. However, it will be evident that such a planetary gear system can be varied in several ways. The planetary gear holder can be connected to the output shaft rather than the input shaft with the ring gear connectable to the input shaft. In any of these combinations, it is of course understood in the art that whenever, upon brake engagement, the output shaft rotates faster than the input shaft then the arrangement is an overdrive while conversely if the output shaft rotates slower than the input shaft, it constitutes an underdrive.

As described above, an important feature of the present invention is that the spring and servo-motor forces, when at a maximum, are not transmitted through rotary bearings in motion. Any time a force is exerted, such as by springs 43, it is of course understood by basic physics principles that the force path is transmitted through a closed loop. When the spring 43 exerts its maximum force, the path of the "closed loop" is through elements 46, 44, 12, 24, 28, 30, 22, 23 and back to springs 43. This path of course crosses rotary bearing 44. However, upon clutch engagement there is not relative rotary movement across bearing 44 since all of the elements described above as constituting the loop rotate together as a unit to effect direct drive upon engagement of said clutch. Of course there is relative rotary movement across bearing 44 when the clutch is disengaged and the brake engaged. However, at this time the residual axial force of spring 43 is essentially negligible so that any detrimental effect thereof on the bearings 44 is nil. As in the case of clutch engagement, so too in the case of brake engagement the force loop does not pass through rotary bearings in motion, and in fact in this case the force loop remains in stationary parts of the system. Specifically, the force loop would pass from element 48 to elements 23, 22, 34, 36, 38, 40 and 50 and back to element 48.

Referring now to FIG. 2, the embodiment shown therein is identical to the embodiment of FIGS. 1 and 1A with the sole exception that it includes in addition to the structure shown in FIGS. 1 and 1A a roller-type free wheel F disposed in parallel with the first coupling or clutch 28, 30. The free wheel F is actually mounted within an extension of the member 24 as shown in the inner part 56 directly connected with the planet gear carrier 14. This arrangement may be used for example where the first coupling or clutch has to hold only for lower levels of torque at coasting.

As a modification of the embodiment described in FIGS. 1 and 1A, such arrangement can also of course be constructed with two intermeshing planet gears between the sun and the ring gear rather than a single planet gear, thereby functioning as a reserve gear. This of course cannot be done in the embodiment of FIG. 2 which includes a free wheel.

Another embodiment of the invention is shown in FIG. 4.

In FIG. 4, co-axial primary input shaft 101 and secondary output tubular shaft 101', the latter connected to output flange 102', are mounted in a casing C by bearings 100 and 104 respectively and, in addition, a third bearing 102 is disposed between the axially overlapping ends of the two shafts. An outer ring gear 106 is carried on the primary shaft 101 by a spline connection 108 and inner teeth 110 of the ring gear mesh with teeth 112 of the planet gears of which one is designated 114. The planet gears 114 are mounted on shafts 116 supported in a planet carrier 118. The teeth 112 of the planet gears 114 also mesh with teeth 120 of a sun gear 122 which is in turn carried by the secondary shaft 101'. The outer gear ring 106 also has an external ring of teeth 111 which mesh with an internally toothed or splined disc clutch plate 130 of a disc brake generally designated CL.

An annular disc member 124 is carried on the sun gear 122 by a spline connection 126 and, by means of a further spline connection 132, the disc member 124 supports an annular and axially slidable member 134. The member 134 has an inwardly projecting flange 136 and also carries by means of the spline connection 132 an annular member 138 having surface 138A which together with the disc brake plate 130 and a surface 124A on member 124, constitute essential components of the disc clutch CL. The member 138 is axially locked to the member 134 by circlips or other locking means 139 and axial movement (to the left as seen in FIGS. 1 and 2) of the member 134 consequently carries with it member 138. Member 138, at its leftmost position forms a brake B with frictional surface 141.

A bearing pad 136A is attached to the flange 136 and cooperates with part 140 which is supported on the casing C via a spline connection 142. The clutch CL is normally urged toward its engaged position by a Belleville spring assembly 128 urging 134 and hence 138 against 130 and 124. Disengagement of the clutch CL is effected by displacement (to the left in FIGS. 1 and 2) of an annular servo-piston 144 which is movable in an annular cylinder 146 and via a lever system 148, urging 134 and 136 to the left until 138 engages 141, this movement fixing 134 and hence 138 and 124 to the casing and freeing 130 and 106 for rotational movement relative to these now fixed elements.

The axial thrust applied to the sun gear 122 during operation of the clutch CL is absorbed by an axial thrust bearing 150 disposed between the sun gear 122 and the planet carrier 118. This construction, when compared with the customary construction of placing a thrust bearing externally relative to the planetary gear system, possesses the advantages of reduced dimensions and lower overall weight of the gear transmission.

Figure 5:
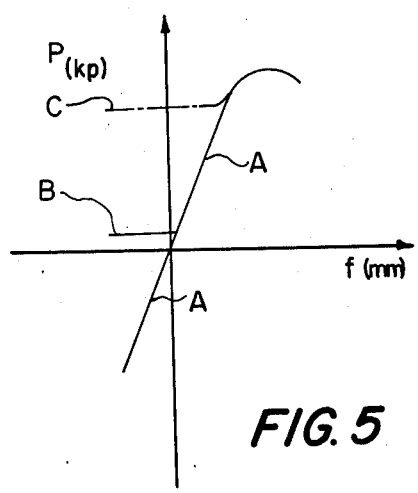
FIG. 5 is a graph illustrating the force characteristics of the Belleville spring shown in FIG. 4.

Another feature of the invention is a spring arrangement incorporating a plurality of Belleville springs wherein one of the springs is loaded in the conventional manner while the other two counterbalance each other resulting in a flattening out of the force curve of the spring arrangement, thereby providing a low axial force over a wide range, at least in the clutch disengaged position, thereby rendering the spring arrangement somewhat less sensitive. This is illustrated in the graph of FIG. 5 wherein plotting force on the vertical axis and deflection distance on the horizontal axis, the three springs may have the characteristics of the three curves A, B and C, all having the same characteristics on the right hand side but differing on the left hand side. The net result thereof will be a strong clutch engaging force at the right hand end of the deflection range and a low but more level force at the lower end of the deflection range.

In the position as illustrated in FIG. 4, the clutch CL is engaged for locking the sun and ring gears for rotation together for direct drive between the input and output shafts. The spring arrangement 128 is urging element 136 to the right along with elements 134 and 138, thereby causing frictional engagement between elements 138, 130 and 124, whereby the element 130 by means of its engagement with teeth 11 cause the sun gear and hence also the planet gears and the planet gear carrier 118 and the output shaft 102 to be rotated together with input shaft 101 and ring gear 106. To shift gears, piston 144 is urged to the left. Its initial movements are smoothed out somewhat by the fact that it acts through a lever 148, the latter engaging the intermediate member 140 which in turns via bearing pad 136A urges inwardly projecting flange 136 and hence also axially slidable member 134 to the left. At first, movement of these elements is retarded by springs 128 thereby assuring a momentary drop in the level of torque transfer through the planetary gear system while the clutch is becoming disengaged and before the brake is engaged, and also assuring a smooth transition from clutch engagement to brake engagement. As described above, the particular type of spring arrangement provided herein will further assure such smooth transition. After a predetermined travel of the piston 144, the axial force exerted by the springs 128 will be reduced, whereby the piston will continue to urge element 134 and hence also annular member 138 to the left until the latter engages frictional surface 141 which may incidently include a hydraulic damping system 143, whereupon the sun gear will be fixed to the stationary casing C, i.e. the brake will be engaged.

This particular embodiment, while assuring a reduction in the level of torque transfer between clutch and brake engagement, nonetheless avoids a complete elimination of torque transfer so that there is not a complete break in the drive line during the transition between gear speeds. When the piston 144 starts to move forward and contacts the lever system 148 which in turn engages the member 140, then for the first one tenth of a second a oil film results in a low coefficient of friction. This is sufficient to initiate disengagement of the clutch CL. When the axial force of the spring arrangement 128 is then reduced, the torque transfer falls off more and a higher coefficient of friction is now obtained. The characteristics of the springs 128 will then determine the lower limit of torque transfer before the brake B engages. Obviously, if desired, one could retain a torque transfer as high as desired, for example more than 50% higher then that which would otherwise be obtained simply by selecting a lining on the left hand side of element 138 with a higher coefficient of friction then on the right hand side thereof.

As illustrated in FIG. 4, this embodiment acts as an underdrive since, upon engagement of the brake, the input shaft including the ring gear 106 rotates faster than the planet carrier 118 and the output shaft 102 connected thereto.

As with the embodiment of FIGS. 1, 1A and 2, in this embodiment the high axial forces exerted by the springs in the clutch engaged position and by the servo-motor in the brake engaged position do not pass through rotary bearings, across which there is relative motion. Specifically, in the clutch engaged position the spring force passes through elements 124, 122, across bearing 150 which is not in motion at this time, and via elements 118, 116, 106, 130, 138, 134, and 136 back to springs 128. All of these parts rotate together so that there is not force transfer across such moving rotary bearings. Similarly, the force of servo-motor 144 passes through stationary elements to member 134 and through elements 138 and 141 back to casing C, cylinder 146 and servo-motor 144.

Figure 6:
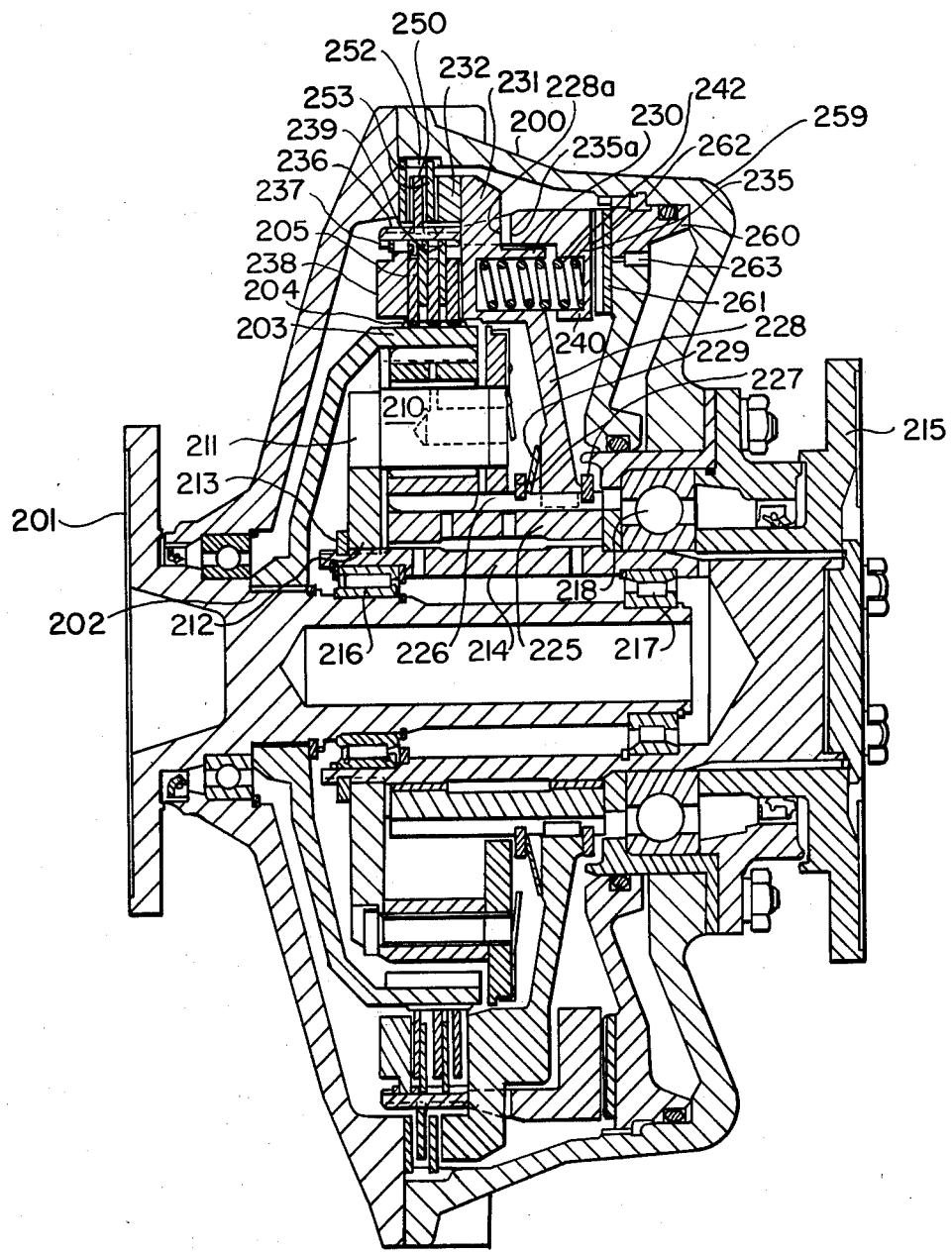
FIG. 6 is a longitudinal cross-sectional view through a two-speed planetary gear transmission showing another embodiment of the present invention.

FIG. 6 illustrates another embodiment of the present invention. The stationary casing is represented by the numeral 200. An input shaft 201 is engaged with a ring gear 203 of the planetary gear system through internal teeth 202 of the ring gear. Said ring gear includes external teeth 204 which engage with disc plates 205 which, in a manner to be described in greater detail below, constitute the friction elements for the direct drive clutch.

The planetary gear system further includes one or more planet gears 210 mounted on a planet carrier 211 which is connected at spline connection 212, at which it is held by a circlip 213 to an output shaft 214 which is connected to the output flange 215. The output shaft 214 is supported on a stationary portion of the transmission through rotary bearings 216 and 217. A further bearing 218 supports the shaft 214 in the stationary casing 200.

The sun gear 255 engages the planets 210 at teeth 226, and also mounted on teeth 226 are a pair of circlips 227, between which are mounted a annular member 228 and a spring such as a Belleville spring 229 urging the member 228 to the right. At its outer end the annular member 228 includes a cup shaped portion 230 which, in a manner to be described below, receives a coil spring 242, and radially outwardly therefrom there is provided an outer flange portion 231 with a bearing block 232 thereon.

This embodiment includes an intermediate member 235 which includes a cylindrical portion 236 with internal teeth 237 thereon. A reaction member 238 is mounted on teeth 237 and fixed against axial movement by circlips while a pair of discs 239 are slidably mounted on teeth 237. These pass between the previously described discs 205. In a manner to be described below, frictional engagement of plates 205 and 239 constitute the direct drive clutch.

The member 235 further includes a cup portion 240, and a spring 242 extends between and exerts an axial force between the two cup shaped portions 230 and 240.

A friction disc 250 is mounted on member 236 and extends outwardly therefrom between a pair of friction discs 253 which are slidable on spline 252 which is rigid with the casing 200. These discs 250 and 253, when engaged, constitute the brake engagement for the second driving speed, i.e. overdrive or underdrive.

The arrangement further includes an annular piston 260 mounted in a cylinder 259 formed in the casing 200. Friction material 261 provides a bearing surface against the right hand side of member 235, and the interface 262 between 235 and 261 is lubricated by oil through channels 263, one of which is shown in the drawings.

It will of course be apparent that the embodiment of FIG. 6 acts as an underdrive in the same manner as the embodiment of FIG. 4.

The embodiment of FIG. 6 operates as follows. The spring arrangement in this case constitutes a combination of springs, namely 229 and 242. Belleville spring 229 is shown in its maximum axial force position whereat it urges member 228 as far as it will go, limited by the right hand circlip 227. However, for final movement of the elements toward the clutch engaged position, the coil spring 242 urges member 235 to the right, carrying member 238 with it and thereby urging the discs 205 and 239 into engagement with each other. This of course locks the ring gear 203 and the sun gear 225 together, the latter via elements 235 and 228. Although it is apparent that member 235 moves axially relative to the member 228, it will also be apparent that these parts are mounted to move angularly together. In the clutch engaged position, the discs 250 and 253 of the brake are of course disengaged.

To shift from clutch to brake, i.e. from direct drive to second drive, the piston 260 is moved to the left. This initial movement does not meet great resistance since it does not offset Belleville spring 229, but rather it offsets only the coil spring 242, moving the member 235 to the left until shoulder 235a abuts shoulder 228a. During this slight movement, the discs 239 and 205 are of course separated from each other such that torque transfer thereacross is substantially reduced. A main feature of this embodiment is that at said point in time when the shoulder 235a abuts shoulder 228a, further movement thereof is significantly retarded by the maximum axial force of spring 229. This assures a momentary interval of low torque transfer before the discs 250 and 253 of the brake become engaged. Then, as the piston 260 continues to move, the spring force of 229 is in fact overcome as the member 235 urges the member 228 such that the portion 231 of the latter, and in particular the bearing block 232 thereof, forces the plates 250 and 253 into frictional engagement, whereby the brake is engaged, stalling the sun gear so that the ring can turn the planets and planet carrier in second gear, i.e. in this case underdrive. During the latter portion of the leftward movement of elements 235 and 228, the axial force exerted by spring 229 is of course at a minimum so that the elements are effective to assure positive engagement of the brake.

As with the previous embodiments, the high forces effecting clutch and brake engagement do not pass through rotary bearings in motion. It is evident that the servo-motor force, upon brake actuation, passes through elements 263, 235, 231, 253, 252 and 200 back to the cylinder 259 and the piston 260. During clutch engagement the force of spring 242 passes simply through the element 228, the discs 205 and 239, and the member 236 back to the right side of spring 242 so that in this case the force follows a rather small loop. Similarly, the path of the forces created by spring 229 also follows a path which excludes any rotary bearings in motion, namely a path from spring 229 through sun gear 225, carrier 211 and planets 210 to the ring gear 203 and through the discs 205 and 239 back to element 228 and the spring 229.

Although the invention has been described in considerable detailed with respect to preferred embodiments thereof, it will be apparent that the invention is capable of numerous modifications and variations apparent to those skilled in the art without departing from the spirit and scope of the invention as defined in the claims.

I claim:

1. A transmission comprising:
  a casing;
  an input shaft and an output shaft,
  a planetary gear including a sun gear, a ring gear and at least one planet gear between and operatively engaging the sun gear and the ring gear, said planet gear or gears mounted on a planet carrier, said planet carrier operatively engaged with one of said shafts, the ring gear operatively engaged with the other of said shafts,
  a clutch arranged to operatively connect the gears of the planetary gear together for direct drive between the input and output shafts,
  a brake arranged to hold stationary said sun gear, permitting a second gear drive between the two shafts at a drive ratio different from said direct drive,
  rotating bearing means for mounting said shafts and said gears for receiving radial forces upon relative rotating motion,
  a spring means for urging said clutch into engagement, and an actuating means mounted stationarily relative to the casing for offsetting the force of the spring means to disconnect the clutch and connect the brake, said spring means including a Belleville spring acting against two parts, both of which rotate together in the clutch engaged direct drive condition,
  the gears of the planetary gear, the spring means and the actuating means being arranged such that upon engagement of the clutch means the force of the spring means bypasses all of said rotating bearing means which rotate during direct drive, and upon engagement of the brake, the force of the further actuating means bypasses all of said rotating bearing means which rotate during said second gear drive.

2. A transmission according to claim 1, said spring means comprising at least one Belleville spring arranged to exert substantially its maximum force at or near its position corresponding to clutch engagement.

3. A transmission according to claim 1, said actuating means comprising a servo-motor stationarily mounted in the casing.

4. A transmission according to claim 1, said spring means having the characteristic of exerting a large biasing force at or close to the position at which the clutch is engaged, and exerting a significantly lower biasing force at a position at which the clutch is disengaged and the brake is engaged.

5. A transmission according to claim 1, in which the input shaft is operatively engaged with an output shaft of a hydrodynamic torque converter having a releasable torque transmitting member.

6. A transmission according to claim 5, said torque converter and said planetary gear being operatively arranged such that the releasable torque transmitting member is always released when shift takes place between said brake and said clutch of the planetary gear.

7. A transmission according to claim 1, wherein both said clutch and said brake are friction couplings.

8. A transmission according to claim 1, wherein the planet carrier has at least one set of two meshing planet gears between the sun and ring gears to provide a reverse drive.

9. A transmission according to claim 1, including a free wheel disposed in parallel with the clutch.

10. A transmission according to claim 1, said sun gear having a part rotatable therewith which is axially slidable to form part of the clutch in one axial position and part of the brake in another axial position, and said actuating means comprising a servo-motor device movable to slide said axially slidable member to the brake engaged position and said spring means being mounted to urge the said axially slidable member to the clutch engaged position.

11. A transmission according to claim 10, said servo-motor being an annular piston stationarily mounted in the casing.

12. A transmission according to claim 10, wherein said planet carrier is engaged with the input shaft and the said ring gear is engaged with the output shaft, wherein the second gear drive is overdrive.

13. A transmission according to claim 12, said Belleville mounted to react against said axially slidable member on the one hand and across a rotary bearing against the ring gear on the other hand.

14. A transmission according to claim 10, said axially slidable member having a pair of opposed frusto-conical surfaces thereon, one of which cooperates with a friction surface on the ring gear to form the clutch and one of which cooperates with a frictional surface on the casing to form the brake.

15. A transmission according to claim 14, in which the angle of conacity of the clutch is smaller than that of the brake.

16. A transmission according to claim 10, wherein said planet carrier is engaged with the output shaft and the said ring gear is engaged with the input shaft, wherein the second drive is underdrive.

17. A transmission according to claim 10, said spring means acting between a part connected to the sun gear for rotation therewith and the ring gear or its shaft.

18. A transmission according to claim 12, said Belleville spring mounted to engage only against axially relatively moving parts of the sun gear to urge the axially slidable member toward a clutch engaged position.

19. A transmission according to claim 10, said axially slidable member comprising a ring shaped member spaced radially outwardly from the ring gear, and including disc plates extending radially outwardly from the ring gear and inwardly from the ring shaped member, said disc plates arranged such that in one position of the ring shaped member the brake is engaged and another position thereof the clutch is engaged.

20. A transmission according to claim 10, said spring means including a plurality of Belleville springs arranged to provide a resultant spring characteristic greatest in the clutch engaged position and decreasing in the brake engaged position more slowly then would a single Belleville spring.

21. A transmission according to claim 10, including a lever means between the servo-motor and the axially slidable member to soften the movements of the axially slidable member relative to the movements of the servo-motor.

22. A transmission according to claim 10, said axially slidable member comprising two parts, namely a first part which engages said sun gear and a second part which engages the servo-motor, and wherein said spring means includes a spring acting between said parts.

23. A transmission according to claim 22, the first part being movable between the brake engaged position and a second position a portion of the way toward the clutch engaged position, and a stop means for limiting movement of the first part at said second position, and said spring means including a first spring and a second spring, said first spring urging said first part toward said second position and exerting its greatest force at said second position and said first part movable to the brake engaged position under the action of the servo-motor acting through the second part and said first part being operable in the brake engaged position to cause engagement of the brake, said second part including means for engaging the clutch disc, and said second spring acting between the first and second parts and urging the second part to a clutch engaged position and causing clutch engagement when the first part is in said second position.

24. A transmission according to claim 23, wherein the first spring is said Belleville spring and the second spring is a coil spring.

25. A transmission according to claim 23, wherein said planet carrier is engaged with the input shaft and the said ring gear is engaged with the output shaft, wherein the second gear drive is overdrive.

26. A transmission according to claim 23, wherein said planet carrier is engaged with the output shaft and the said ring gear is engaged with the input shaft, wherein the second drive is underdrive.

27. A transmission according to claim 1, said clutch and brake being friction couplings.

28. A transmission according to claim 1, said Belleville spring acting on the one hand against the axially slidable member and on the other hand across a bearing on the ring gear.

29. A transmission according to claim 1, each of said brake and clutch being disc plate type friction couplings, and said axially slidable member operable to engage the brake in one position and to engage the clutch in another axial position.

30. A transmission comprising:
a casing,
an input shaft and an output shaft,
a planetary gear including a sun gear, a ring gear and at least one planet gear between and operatively engaging the sun gear and the ring gear, said planet gear or gears mounted on a planet carrier, said planet carrier operatively engaged with one of said shafts, the ring gear operatively engaged with the other of said shafts,
a clutch arranged to operatively connect the gears of the planetary gear together for direct drive between the input and output shafts,
a brake arranged to hold stationary said sun gear, permitting a second gear drive between the two shafts at a drive ratio different from said direct drive,
and a spring means for urging said clutch into engagement, and an actuating means mounted stationarily relative to the casing for offsetting the force of the spring means to disconnect the clutch and connect the brake, said spring means having the characteristic of exerting a large biasing force at or close to the position at which the clutch is engaged, and exerting a significantly lower biasing force at a position at which the clutch is disengaged and the brake is engaged,
said spring means comprising a pair of springs including a stiff first spring and also a second spring more resilient than the first spring and continuously urging the clutch into engagement, said first spring positioned to exert its force causing clutch actuation only close to but not completely up to the clutch engaged position, such that as the further actuating means acts to disengage the clutch and engage the brake, it at first opposes only the force of the second spring and then after a finite distance of travel, is opposed by the said first spring.

31. A transmission according to claim 30, wherein the first spring is a Belleville spring and the second spring is a coil spring.

32. A transmission according to claim 30, said sun gear having a part rotatable therewith which is axially slidable to form part of the clutch in one axial position and part of the brake in another axial position, and said actuating means comprising a servo-motor device movable to slide said axially slidable member to the brake engaged position and said spring means being mounted to urge the said axially slidable member to the clutch engaged position.

33. A transmission according to claim 32, said axially slidable member comprising two parts, namely a first part which engages said sun gear and a second part which engages the servo-motor, and wherein said spring means includes a spring acting between said parts.

34. A transmission according to claim 33, the first part being movable between the brake engaged position and a second position a portion of the way towards the clutch engaged position, and a stop means for limiting movement of the first part at said second position, said first spring exerts its greatest force at said second position, and said first part being movable to the brake engaged position under the action of the servo-motor acting through the second part and said first part be operable in the brake engaged position to cause engagement of the brake, said second part including means for engaging the clutch, and said second spring acting between the first and second parts and urging the second part to a clutch engaged position and causing clutch engagement when the first part is in said second position.

35. A transmission according to claim 34, wherein the first spring is a Belleville spring and the second spring is a coil spring.

* * * * *